(12) United States Patent
Yang et al.

(10) Patent No.: US 9,445,441 B2
(45) Date of Patent: Sep. 13, 2016

(54) SYSTEM AND METHOD FOR PROCESSING TRIGGER MESSAGES OF A TERMINAL

(75) Inventors: Kun Yang, Shenzhen (CN); Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/117,303

(22) PCT Filed: Nov. 24, 2011

(86) PCT No.: PCT/CN2011/082864
§ 371 (c)(1),
(2), (4) Date: Nov. 14, 2013

(87) PCT Pub. No.: WO2012/155485
PCT Pub. Date: Nov. 22, 2012

(65) Prior Publication Data
US 2014/0087718 A1    Mar. 27, 2014

(30) Foreign Application Priority Data

Sep. 30, 2011   (CN) .......................... 2011 1 0297394

(51) Int. Cl.
*H04W 76/02*    (2009.01)
*H04W 4/00*     (2009.01)
*H04W 8/18*     (2009.01)
*H04L 29/06*    (2006.01)
*H04W 88/18*    (2009.01)

(52) U.S. Cl.
CPC ............. *H04W 76/02* (2013.01); *H04L 69/28* (2013.01); *H04W 4/005* (2013.01); *H04W 8/18* (2013.01); *H04W 88/18* (2013.01)

(58) Field of Classification Search
None
See application file for complete search history.

(56) References Cited

U.S. PATENT DOCUMENTS

| 2004/0048627 | A1* | 3/2004 | Olvera-Hernandez . | H04W 4/14 455/466 |
| 2010/0136948 | A1* | 6/2010 | Bychkov ............... | H04M 15/00 455/406 |
| 2011/0110308 | A1* | 5/2011 | Liang .................... | H04W 60/06 370/328 |
| 2012/0036186 | A1* | 2/2012 | Mariblanca Nieves .................... | H04L 12/14 709/203 |
| 2013/0013741 | A1* | 1/2013 | Norp ..................... | H04W 4/005 709/219 |
| 2013/0115893 | A1* | 5/2013 | Hietalahti ............. | H04W 48/02 455/68 |

(Continued)

FOREIGN PATENT DOCUMENTS

| CN | 101141225 A | 3/2008 |
| CN | 102149198 A | 10/2011 |

OTHER PUBLICATIONS

"GUTI Reallocation Procedure", Release 8, 3GPP TS 23.401 V8.2. 0, pp. 77-81, Jun. 2008.*

(Continued)

*Primary Examiner* — Hilina K Demeter
(74) *Attorney, Agent, or Firm* — IPLM Group, P.A.

(57) ABSTRACT

A method and system for processing trigger message of a terminal, wherein, the method includes: after receiving trigger message which is transmitted from a machine type communication server to the terminal, a control network element in a core network storing the trigger message of the terminal, and removing the trigger message of the terminal before a validity timer for the trigger message of the terminal expires. The control network element in the present scheme removes the stored trigger message in time before the validity timer for the trigger message of the terminal expires, thus saving the storage resources of the network.

10 Claims, 1 Drawing Sheet

(56) References Cited

U.S. PATENT DOCUMENTS

| | | | | |
|---|---|---|---|---|
| 2013/0260811 | A1* | 10/2013 | Rayavarapu | H04W 76/028 455/509 |
| 2014/0233524 | A1* | 8/2014 | Jang | H04W 74/0833 370/329 |

OTHER PUBLICATIONS

International Search Report issued in PCT/CN2011/082864 (with English translation), 5 pages, mailed Jul. 12, 2012.

"3rd Generation Partnership Project; Technical Specification Group Services and System Aspects; System Improvements for Machine-Type Communications; (Release 11)", 3GPP Standard; 3GPP TR 23.888, 3rd Generation Partnership Project (3GPP), Mobile Competence Centre; 650, Route Des Lucioles; F-06921 Sophia-Antipolis Cedex ; France, vol. SA WG2, No. V1.4.0, Aug. 5, 2011, pp. 1-139.

HTC et al: "Solution of Suppressing Device Trigger", 3GPP Draft; S2-113680-WASS2-113217WASS2-112259_Supressrigger-V6, 3rd Generation Partnership Project (3GPP), Mobile Competence Centre; 650, Route Des Lucioles; F-06921 Sophia-Antipolis Cedex; France, vol. SA WG2, No. Naantali; Jul. 11, 2011, Jul. 13, 2011.

HTC: "Device Trigger with required MTC features provisioning", 3GPP Draft; S2-112260-WASS2-111587-Device-Trigger, 3rd Generation Partnership Project (3GPP), Mobile Competence Centre; 650, Route Des Lucioles; F-06921 Sophia-Antipolis Cedex; France, vol. SA WG2, No. Xi'An; May 16, 2011, May 11, 2011.

Alcatel-Lucent: "Triggering MTC devices w/o SMS or long lasting NAT bindings", 3GPP Draft; S2-111223,3rd Generation Partnership Project (3GPP), Mobile Competence Centre; 650, Route Des Lucioles; F-06921 Sophia-Antipolis Cedex; France, vol. SA WG2, No. Salt Lake City; Feb. 21, 2011, Feb. 26, 2011.

ZTE: "Update HSS based device trigger solution", 3GPP Draft; S2-113082, 3rd Generation Partnership Project (3GPP), Mobile Competence Centre; 650, Route Des Lucioles; F-06921 Sophia-Antipolis Cedex; France, vol. SA WG2, No. Naantali; Jul. 11, 2011, Jul. 5, 2011.

European Search Report issued in EP Application No. 11865672, completed Oct. 29, 2015, 2 pages.

* cited by examiner

SYSTEM AND METHOD FOR PROCESSING TRIGGER MESSAGES OF A TERMINAL

TECHNICAL FIELD

The present document relates to the technology of processing trigger message of a terminal in the field of mobile communication technologies, and in particular, to a method and system for processing trigger message of a terminal.

BACKGROUND OF THE RELATED ART

The cellular wireless communication system is mainly composed of a Core Network (CN), a Radio Access Network (RAN) and a terminal. The core network is responsible for businesses of a non-access layer, such as location update of a terminal etc., and is an anchor point at the user plane. The access network comprises a base station, or a base station and a base station control, and the access network is responsible for businesses of an access layer (such as radio resource management), there can be a physical or logical connection between base stations according to actual situations, a base station can be connected to one or more other base stations, and each base station can be connected to one or more core network nodes. The terminal, i.e., User Equipment (UE), refers to various devices which can communicate with cellular wireless communication networks, such as mobile phones or laptops, etc.

The Mobility Management Entity (MME) and Serving GPRS Support Node (SGSN) are units in a core network which are responsible for management of access controlling, location information updating and switching for a terminal, and are responsible for functions of non-access layer signaling controlling from the core network to the terminal and registering the terminal at the network.

The Home User Server (HSS) and Home User Location Register (HLR) are entities in the core network which are responsible for storing identity information, authentication information, authorization information and the like of the terminal device. Depending on different conditions, the HSS or HLR can be used to store identity information of the user and binding information between the user and the terminal device, or only store the identity information of the user (the binding information between the user and the terminal device can be stored by the network gateway), or directly store the identity information of the terminal device. The HSS or HLR is also responsible for the subscription database of the user, and performs user identity authentication and authorization etc. A business platform can inquire user or terminal information from the HSS or HLR.

The Machine Type Communication (MTC) Interworking Function entity (IWF), i.e., the MTC IWF, is a connection entity between the mobile communication network and an external public network, which can implement functions such as protocol conversion, address inquiry, information preservation etc. The Interworking Function entity is connected externally to an application server, and is connected internally to the HSS/HLR, or MME/SGSN.

Usually, there are some businesses, for example, a monitoring management system needs to acquire monitoring data from a monitor terminal and needs to establish a connection with a server through a trigger terminal of the server, to report required data. Then, after the terminal receives the trigger message of the server, it needs to be able to respond immediately, to establish a connection with the server. At present, in order to meet the trigger needs of the server for the terminal, the existing solutions transmit the trigger information to the HSS through the server, and then inquire MME or SGSN of the served terminal through the HSS, transmit the trigger message to the MME or SGSN, then transmit the trigger message to the terminal through the non-access layer signaling, and the terminal establishes a connection with the server according to the trigger message. The existing networks still retain the trigger message of the terminal before the validity timer of the trigger message of the terminal expires, which inevitably causes a waste of storage resources of the network.

SUMMARY OF THE INVENTION

The technical problem to be solved by the present document is to provide a method and system for processing trigger message of a terminal, which avoids a waste of storage resources of the network resulting from overtime storage of the trigger message of the terminal.

In order to solve the above technical problem, a method for processing trigger message of a terminal is provided, wherein, a control network element in a core network stores trigger message after receiving the trigger message transmitted by a machine type communication server to the terminal, and removes the trigger message before a validity timer for the trigger message of the terminal expires.

Wherein, the above method can also be characterized in that, when determining that a mobile reachable timer expires and the validity timer for the trigger message of the terminal does not expire, the control network element removes the trigger message of the terminal; or when determining that the mobile reachable timer expires, the control network element starts an implicit detach timer, and when determining that the implicit detach timer expires and the validity timer for the trigger message of the terminal does not expire, the control network element removes the trigger message of the terminal.

Wherein, the above method can also be characterized in that, after removing the trigger message, the control network element transmits trigger response message to the machine type communication server through a storage network element in the core network, to notify the machine type communication server that the transmission of the trigger message of the terminal fails.

Wherein, the above method can also be characterized in that, after receiving the trigger response message, the storage network element removes the stored trigger message.

Wherein, the above method can also be characterized in that, the control network element is a Mobility Management Entity (MME), and the storage element network is a Home Subscriber Server (HSS); or the control network element is a Service GPRS Supporting Node (SGSN), and the storage network element is a Home Location Register (HLR).

In order to solve the above technical problem, a system for processing trigger message of a terminal is also provided, comprising: a control network element located in a core network, wherein, the control network element comprises a storage unit and a processing unit; the storage unit is configured to store trigger message after the control network element receives the trigger message which is transmitted by a machine type communication server to the terminal; the processing unit is configured to remove the trigger message of the terminal before a validity timer for the trigger message of the terminal expires.

Wherein, the above system can also be characterized in that, the processing unit is further configured to, when determining a mobile reachable timer expires and the validity timer for the trigger message of the terminal does not expire, remove the trigger message of the terminal; or when determining that the mobile reachable timer expires, start an implicit detach timer, and when determining that the implicit detach timer expires and the validity timer for the trigger message of the terminal does not expire, remove the trigger message of the terminal.

Wherein, the above system can also be characterized in that, the control network element further comprises a transmitting unit, and the system further comprises a storage network element located in a core network;

the transmitting unit is configured to transmit trigger response message to the machine type communication server through the storage network element in the core network after the processing unit removes the trigger message of the terminal, to notify the machine type communication server that the transmission of the trigger message of the terminal fails.

Wherein, the above system can also be characterized in that, the storage network element is configured to remove the stored trigger message after receiving the trigger response message.

Wherein, the above system can also be characterized in that, the control network element is a Mobility Management Entity (MME), and the storage element network is a Home Subscriber Server (HSS); or the control network element is a Service GPRS Supporting Node (SGSN), and the storage network element is a Home Location Register (HLR).

A method for processing trigger message of a terminal, comprising:

a control network element in a core network storing trigger message of the terminal after receiving the trigger message which is transmitted by a machine type communication server to the terminal, and removing the trigger message of the terminal before a validity timer for the trigger message of the terminal expires.

Wherein, the step of the control network element removing the trigger message of the terminal before a validity timer for the trigger message of the terminal expires comprises:

when determining that a mobile reachable timer expires and the validity timer for the trigger message of the terminal does not expire, the control network element removing the trigger message of the terminal; or when determining that the mobile reachable timer expires, the control network element starting an implicit detach timer, and when determining that the implicit detach timer expires and the validity timer for the trigger message of the terminal does not expire, the control network element removing the trigger message of the terminal.

The method further comprises: after removing the trigger message, the control network element transmitting trigger response message to the machine type communication server through a storage network element in the core network, to notify the machine type communication server that the transmission of the trigger message of the terminal fails.

The method further comprises: after receiving the trigger response message, the storage network element removing the stored trigger message of the terminal.

Wherein, the control network element is a Mobility Management Entity (MME), and the storage element network is a Home Subscriber Server (HSS); or the control network element is a Service GPRS Supporting Node (SGSN), and the storage network element is a Home Location Register (HLR).

A system for processing trigger message of a terminal, comprising: a control network element located in a core network, and the control network element comprising a storage unit and a processing unit, wherein, the storage unit is configured to store trigger message after the control network element receives the trigger message which is transmitted by a machine type communication server to the terminal;

the processing unit is configured to remove the trigger message of the terminal before a validity timer for the trigger message of the terminal expires.

Wherein, the processing unit is configured to remove the trigger message of the terminal before a validity timer for the trigger message of the terminal expires by means of:

when determining a mobile reachable timer expires and the validity timer for the trigger message of the terminal does not expire, removing the trigger message of the terminal; or when determining that the mobile reachable timer expires, starting an implicit detach timer, and when determining that the implicit detach timer expires and the validity timer for the trigger message of the terminal does not expire, removing the trigger message of the terminal.

Wherein, the control network element further comprises a transmitting unit, and the system further comprises a storage network element located in the core network, wherein, the transmitting unit is configured to transmit trigger response message to the machine type communication server through the storage network element in the core network after the processing unit removes the trigger message of the terminal, to notify the machine type communication server that the transmission of the trigger message of the terminal fails.

Wherein, the storage network element is configured to remove the stored trigger message after receiving the trigger response message.

Wherein, the control network element is a Mobility Management Entity (MME), and the storage element network is a Home Subscriber Server (HSS); or the control network element is a Service GPRS Supporting Node (SGSN), and the storage network element is a Home Location Register (HLR).

The control network element in the present scheme removes the stored trigger message in time before the validity timer for the trigger message of the terminal expires, thus saving the storage resources of the network.

PREFERRED EMBODIMENTS OF THE INVENTION

Figure 1:
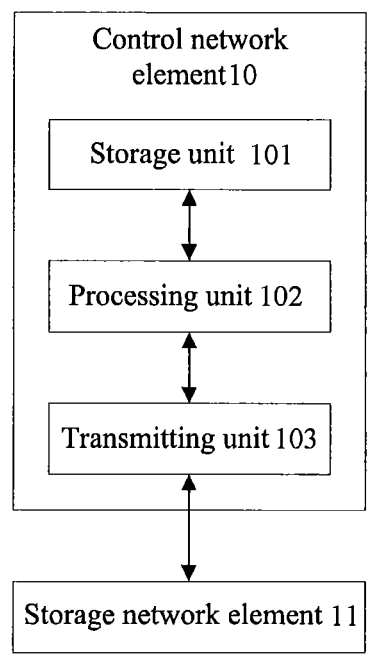
FIG. 1 is a diagram of the structure of a system according to an example of the present document.
Figure 2:
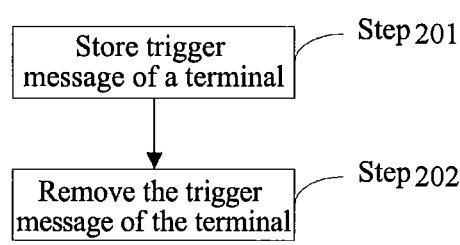
FIG. 2 is a diagram of a flowchart of a method according to an example of the present document.

The implementation of the embodiments of the present document will be further described in detail in conjunction with accompanying drawings hereinafter.

The system for processing trigger message of a terminal in the present scheme comprises a control element 10 located in a core network, wherein, the control network element comprises a storage unit 101 and a processing unit 102, wherein, the storage unit 101 is configured to store the trigger message of the terminal after the control network element receives trigger message which is transmitted from a machine type communication server to the terminal;

the processing unit 102 is configured to remove the trigger message before a validity timer for the trigger message of the terminal expires.

The processing unit 102 can use different time points to remove the trigger message before the validity timer for the trigger message of the terminal expires, which can be but not limited to selecting a time point when a mobile reachable timer of the terminal expires and a time point when the implicit detach timer expires, and other time points can also be selected in the present scheme. For example, the processing unit 102 is further configured to remove the trigger message when it is determined that the mobile reachable timer expires and the validity timer of the trigger message does not expire; or start the implicit detach timer when the mobile reachable timer of the terminal expires, and remove the trigger message when it is determined that the implicit detach timer expires and the validity timer of the trigger message does not expire.

The control network element further comprises a transmitting unit 103, and the system further comprises a storage network element 11 located in the core network, wherein:

the transmitting unit 103 is configured to transmit trigger response message to the machine type communication server through the storage network element 11 of the core network after the processing unit 102 removes the trigger message, to notify the machine type communication server that the transmission of the trigger message of the terminal fails.

The storage network element 11 is configured to remove the stored trigger message after receiving the trigger response message. The storage network element 11 removes the stored trigger message in time according to the instruction of the control network element, which can save the storage resources of the system.

The control network element is a Mobility Management Entity (MME), and the storage element network is a Home Subscriber Server (HSS); or the control network element is a Service GPRS Supporting Node (SGSN), and the storage network element is a Home Location Register (HLR).

A method for processing trigger message of a terminal, comprises the following steps:

in step 201, after receiving trigger message which is transmitted from a machine type communication server to the terminal, a control network element in a core network stores the trigger message of the terminal;

in step 202, the control network element removes the trigger message before a validity timer for the trigger message of the terminal expires.

In the present method, different time points can be used to remove the trigger message before the validity timer for the trigger message of the terminal expires, which can be but not limited to a time point when a mobile reachable timer of the terminal expires and a time point when the implicit detach timer expires, and other time points can also be selected in the present scheme. For example, when determining that the mobile reachable timer of the terminal expires and the validity timer of the trigger message does not expire, the control network element removes the trigger message; or when the mobile reachable timer expires, the control network element starts the implicit detach timer, and when determining that the implicit detach timer expires and the validity timer of the trigger message does not expire, the control network element removes the trigger message.

After removing the trigger message, the control network element transmits trigger response message to the machine type communication server through the storage network element in the core network, to notify the machine type communication server that the transmission of the trigger message of the terminal fails.

After receiving the trigger response message, the storage network element removes the stored trigger message. The storage network element removes the stored trigger message in time according to the instruction of the control network element, which can save the storage resources of the system.

The control network element is a Mobility Management Entity (MME), and the storage element network is a Home Subscriber Server (HSS);

or, the control network element is a Service GPRS Supporting Node (SGSN), and the storage network element is a Home Location Register (HLR).

The present document will be described in detail through application examples below.

Application Example One

The transfer path for the trigger message in the present application example is MTC IWF-HSS-MME.

In step one, after the terminal is powered on and is attached to the network, if a signaling connection between the terminal and the current serving MME of the terminal is released or interrupted, the terminal enters an idle state from a connection state, and the MME starts a mobile reachable timer.

In step two, when the MTC application server needs to obtain real-time data from the terminal, the trigger message is transmitted to the MTC IWF. The trigger message includes an identifier of the terminal, an identifier of the application, an address of the server, a validity time indicated by the trigger etc. (the identifier of the terminal here is an external identifier used outside the network).

In step three, a local database of the MTC IWF stores a one-to-one mapping table between the external identifier and the internal identifier, and a multiple-to-one mapping table between the internal identifier and the HSS. The MTC IWF parses the trigger message, reads the identifier of the terminal in the trigger message, searches for the internal identifier used in the network which corresponds to the identifier of the terminal in the trigger message according to the mapping table between the external identifier and the internal identifier stored in the local database, and searches for the HSS where the terminal is located in the mapping table between the internal identifier and the HSS stored in the database according to the internal identifier. After finding the HSS where the terminal is located, new trigger message is constructed, and the external identifier of the terminal in the original trigger message is replaced with the internal identifier of the terminal, and the internal identifier is transmitted to the HSS through a trigger request signaling.

In step four, after the terminal registers at the network, the HSS stores the current serving MME of the terminal. After receiving the trigger message, the HSS searches for the serving MME of the terminal in the information stored locally according to the identifier of the terminal in the trigger message, and transmits the trigger message to the MME through an insert subscriber data signaling.

In step five, after receiving the insert subscriber data signaling transmitted by the HSS, the MME reads the trigger message included therein, sets a trigger timer T1 locally, sets a value of the timer T1 locally according to a validity time value in the trigger message, starts the timer, and stores the trigger message of the terminal at the same time.

In step six, when determining that the mobile reachable timer expires and the validity timer for the trigger message does not expire, the MME removes the trigger message. The MME transmits trigger response message to the HSS through a Stream Control Transmission Protocol (SCTP) signaling on an S6a reference point (a reference point between the MME and the HSS), to notify the HSS that the transmission of the trigger message of the terminal fails.

As the terminal is in an idle state, the MME will not transmit the trigger message immediately, but needs to wait to transmit the trigger message after a NAS connection is established between the terminal and the MME. In the prior art, if the mobile reachable timer of the terminal expires and the trigger timer T1 corresponding to the trigger message does not expire, the trigger message is still valid, and the MME still retains the trigger message.

In step seven, after receiving the stream control transmission protocol signaling transmitted by the MME, the HSS reads the trigger response message included therein, and removes the trigger message of the terminal. Meanwhile, the HSS transmits the trigger response signaling to the MTC IWF to notify the MTC IWF that the transmission of the trigger message of the terminal fails.

In step eight, after receiving the trigger response signaling transmitted by the HSS, the MTC IWF removes the trigger message of the terminal, and transmits the trigger response message to the MTC application server, to notify the MTC application server that the transmission of the trigger message of the terminal fails.

Application Example Two

The transfer path for the trigger message in the present application example is MTC IWF-HSS-MME.

Steps one to five correspond to and are the same with steps one to five in the specific Example One.

In step six, as the terminal is in an idle state, the MME will not transmit the trigger message immediately, but needs to wait to transmit the trigger message after a NAS connection is established between the terminal and the MME. If the mobile reachable timer of the terminal expires, the network starts an implicit detach timer.

In step seven, when determining that the implicit detach timer expires and the validity timer T1 for the trigger message does not expire, the MME removes the trigger message. The MME transmits trigger response message to the HSS through a SCTP signaling on the S6a reference point, to notify the HSS that the transmission of the trigger message of the terminal fails.

If the implicit detach timer expires and the trigger timer T1 corresponding to the trigger message does not expire, the trigger message is still valid, and the MME still retains the trigger message.

In step eight, after receiving the SCTP signaling transmitted by the MME, the HSS reads the trigger response message included therein, and removes the trigger message of the terminal. Meanwhile, the HSS transmits the trigger response signaling to the MTC IWF, to notify the MTC IWF that the transmission of the trigger message of the terminal fails.

In step nine, after receiving the trigger response signaling transmitted by the HSS, the MTC IWF removes the trigger message of the terminal, and transmits the trigger response message to the MTC application server, to notify the MTC application server that the transmission of the trigger message of the terminal fails.

Application Example Three

The transfer path for the trigger message in the present application example is MTC IWF-HLR-SGSN.

In step one, after the terminal is powered on and is attached to the network, if a signaling connection between the terminal and the current serving SGSN of the terminal is released or interrupted, the terminal enters an idle state from a connection state, and the SGSN starts a mobile reachable timer.

In step two, when the MTC application server needs to obtain real-time data from the terminal, the trigger message is transmitted to the MTC IWF. The trigger message includes an identifier of the terminal, an identifier of the application, an address of the server, a validity time indicated by the trigger etc. (the identifier of the terminal here is an external identifier used outside the network).

In step three, a local database of the MTC IWF stores a one-to-one mapping table between the external identifier and the internal identifier, and a multiple-to-one mapping table between the internal identifier and the HLR. The MTC IWF parses the trigger message, reads the identifier of the terminal in the trigger message, searches for the internal identifier used in the network which corresponds to the identifier of the terminal in the trigger message according to the mapping table between the external identifier and the internal identifier stored in the local database, and searches for the HLR where the terminal is located in the mapping table between the internal identifier and the HLR stored in the database according to the internal identifier. After finding the HLR where the terminal is located, new trigger message is constructed, and the external identifier of the terminal in the original trigger message is replaced with the internal identifier of the terminal, and the internal identifier is transmitted to the HLR through a trigger request signaling.

In step four, after the terminal registers at the network, the HLR stores the current serving SGSN of the terminal. After receiving the trigger message, the HLR searches for the serving SGSN of the terminal in the information stored locally according to the identifier of the terminal in the trigger message, and transmits the trigger message to the SGSN through an insert subscriber data signaling.

In step five, after receiving the insert subscriber data signaling which is transmitted by the HLR, the SGSN reads the trigger message included therein, sets a trigger timer T2 locally, sets a value of the timer T2 locally according to a validity time value in the trigger message, starts the timer, and stores the trigger message of the terminal at the same time.

In step six, when determining that the mobile reachable timer of the terminal expires and the validity timer for the trigger message does not expire, the SGSN removes the trigger message. The SGSN transmits trigger response message to the HLR through a Mobile Application Part (MAP) signaling through a Gr reference point (a reference point between the SGSN and the HLR), to notify the HLR that the transmission of the trigger message of the terminal fails.

As the terminal is in an idle state, the SGSN will not transmit the trigger message immediately, but needs to wait to transmit the trigger message after a NAS connection is established between the terminal and the SGSN. Before this, if the mobile reachable timer of the terminal expires and the trigger timer T2 corresponding to the trigger message does not expire, the trigger message is still valid, and the SGSN still retains the trigger message.

In step seven, after receiving the MAP signaling transmitted by the SGSN, the HLR reads the trigger response message included therein, and removes the trigger message of the terminal. Meanwhile, the HLR transmits the trigger response signaling to the MTC IWF, to notify the MTC IWF that the transmission of the trigger message of the terminal fails.

In step eight, after receiving the trigger response signaling transmitted by the HLR, the MTC IWF removes the trigger message of the terminal, and transmits the trigger response message to the MTC application server, to notify the MTC application server that the transmission of the trigger message of the terminal fails.

Specific Example Four

The transfer path for the trigger message in the present application example is MTC IWF-HLR-SGSN.

Steps one to five correspond to and are the same with steps one to five in the specific embodiment one.

In step six, as the terminal is in an idle state, the SGSN will not transmit the trigger message immediately, but needs to wait to transmit the trigger message after a NAS connection is established between the terminal and the SGSN. Before this, if the mobile reachable timer of the terminal expires, the network starts an implicit detach timer.

In step seven, when determining that the implicit detach timer expires and the validity timer T2 for the trigger message does not expire, the SGSN removes the trigger message. The SGSN transmits trigger response message to the HLR through the MAP signaling on the Gr reference point, to notify the HLR that the transmission of the trigger message of the terminal fails.

If the implicit detach timer expires and the trigger timer T2 corresponding to the trigger message does not expire, the trigger message is still valid, and the SGSN still retains the trigger message.

In step eight, after receiving the MAP signaling transmitted by the SGSN, the HLR reads the trigger response message included therein, and removes the trigger message of the terminal. Meanwhile, the HLR transmits the trigger response signaling to the MTC IWF, to notify the MTC IWF that the transmission of the trigger message of the terminal fails.

In step nine, after receiving the trigger response signaling transmitted by the HLR, the MTC IWF removes the trigger message of the terminal, and transmits the trigger response message to the MTC application server, to notify the MTC application server that the transmission of the trigger message of the terminal fails.

It should be illustrated that, the examples in the present application and features in the examples can be combined with each other without conflict.

Of course, the present document can also have other multiple embodiments, and those skilled in the art can make various corresponding changes and variations on the present document without departing from the spirit and substance of the present document, but all these corresponding changes and variations fall within the protection scope of the appended claims of the present document.

A person having ordinary skill in the art can understand that all or a part of steps in the above method can be implemented by programs instructing related hardware, and the programs can be stored in a computer readable storage medium, such as a read-only memory, disk or disc etc. Alternatively, all or a part of steps in the above embodiments can also be implemented by one or more integrated circuits. Accordingly, each module/unit in the above embodiments can be implemented in a form of hardware, and can also be implemented in a form of software functional module. The present document is not limited to a combination of any particular forms of hardware and software.

INDUSTRIAL APPLICABILITY

The control network element in the present scheme removes the stored trigger message in time before a validity timer for the trigger message of the terminal expires, which saves the storage resources of the network. Therefore, the present document has strong industrial applicability.

What is claimed is:

1. A method for processing a trigger message of a terminal, comprising:
   a control network element in a core network storing the trigger message of the terminal after receiving the trigger message which is transmitted by a machine type communication server to the terminal, and removing the trigger message of the terminal before a validity timer for the trigger message of the terminal expires;
   wherein, the step of the control network element removing the trigger message of the terminal before a validity timer for the trigger message of the terminal expires comprises:
   when determining that a mobile reachable timer expires, the control network element starting an implicit detach timer, and when determining that the implicit detach timer expires and the validity timer for the trigger message of the terminal does not expire, the control network element removing the trigger message of the terminal, so that the implicit detach timer is combined with the mobile reachable timer and the validity timer together to trigger the operation of removing the trigger message of the terminal.

2. The method according to claim 1, further comprising:
   after removing the trigger message, the control network element transmitting a trigger response message to the machine type communication server through a storage network element in the core network, to notify the machine type communication server that the transmission of the trigger message of the terminal fails.

3. The method according to claim 2, further comprising:
   after receiving the trigger response message, the storage network element removing the stored trigger message of the terminal.

4. The method according to claim 2, wherein,
   the control network element is a Mobility Management Entity (MME), and the storage element network is a Home Subscriber Server (HSS); or
   the control network element is a Service GPRS Supporting Node (SGSN), and the storage network element is a Home Location Register (HLR).

5. The method according to claim 3, wherein,
   the control network element is a Mobility Management Entity (MME), and the storage element network is a Home Subscriber Server (HSS); or the control network element is a Service GPRS Supporting Node (SGSN), and the storage network element is a Home Location Register (HLR).

6. A system for processing a trigger message of a terminal, comprising: a control network element located in a core network, and the control network element comprising a storage unit and a processing unit, wherein, the storage unit is configured to store the trigger message after the control network element receives the trigger message which is transmitted by a machine type communication server to the terminal;

the processing unit is configured to remove the trigger message of the terminal before a validity timer for the trigger message of the terminal expires;

wherein, the processing unit is further configured to remove the trigger message of the terminal before a validity timer for the trigger message of the terminal expires by means of:

when determining that a mobile reachable timer of the terminal expires, starting an implicit detach timer, and when determining that the implicit detach timer expires and the validity timer for the trigger message of the terminal does not expire, removing the trigger message of the terminal, so that the implicit detach timer is combined with the mobile reachable timer and the validity timer together to trigger the operation of removing the trigger message of the terminal.

7. The system according to claim 6, wherein, the control network element further comprises a transmitting unit, and the system further comprises a storage network element located in the core network, wherein, the transmitting unit is configured to transmit a trigger response message to the machine type communication server through the storage network element in the core network after the processing unit removes the trigger message of the terminal, to notify the machine type communication server that the transmission of the trigger message of the terminal fails.

8. The system according to claim 7, wherein, the storage network element is configured to remove the stored trigger message after receiving the trigger response message.

9. The system according to claim 7, wherein, the control network element is a Mobility Management Entity (MME), and the storage element network is a Home Subscriber Server (HSS); or the control network element is a Service GPRS Supporting Node (SGSN), and the storage network element is a Home Location Register (HLR).

10. The system according to claim 8, wherein, the control network element is a Mobility Management Entity (MME), and the storage element network is a Home Subscriber Server (HSS); or the control network element is a Service GPRS Supporting Node (SGSN), and the storage network element is a Home Location Register (HLR).

* * * * *